United States Patent
Guillet De Chatellus et al.

(10) Patent No.: US 12,355,489 B2
(45) Date of Patent: Jul. 8, 2025

(54) WIDE-BAND DEVICE FOR MEASURING THE CROSS-CORRELATION OF SIGNALS

(71) Applicants: CENTRE NATIONAL DE LA RECHERCHE SCIENTIFIQUE, Paris (FR); UNIVERSITE GRENOBLE ALPES, Saint Martin d'Heres (FR)

(72) Inventors: Hugues Guillet De Chatellus, Saint Martin d'Heres (FR); Guillaume Bourdarot, Saint Martin d'Heres (FR); Jean-Philippe Berger, Saint Martin d'Heres (FR)

(73) Assignees: CENTRE NATIONAL DE LA RECHERCHE SCIENTIFIQUE, Paris (FR); UNIVERSITE GRENOBLE ALPES, Saint-Martin-d'heris (FR)

( * ) Notice: Subject to any disclaimer, the term of this patent is extended or adjusted under 35 U.S.C. 154(b) by 247 days.

(21) Appl. No.: 18/265,224

(22) PCT Filed: Dec. 3, 2021

(86) PCT No.: PCT/EP2021/084233
§ 371 (c)(1),
(2) Date: Jun. 2, 2023

(87) PCT Pub. No.: WO2022/122593
PCT Pub. Date: Jun. 16, 2022

(65) Prior Publication Data
US 2024/0007188 A1 Jan. 4, 2024

(30) Foreign Application Priority Data
Dec. 7, 2020 (FR) .................................... 2012782

(51) Int. Cl.
*H04B 10/50* (2013.01)
*H04B 10/2557* (2013.01)

(52) U.S. Cl.
CPC ....... *H04B 10/2557* (2013.01); *H04B 10/501* (2013.01)

(58) Field of Classification Search
None
See application file for complete search history.

(56) References Cited

U.S. PATENT DOCUMENTS 10,234,706 B2 * 3/2019 Guillet De Chatellus ................. H01S 3/0057
11,366,012 B2 * 6/2022 Azana ..................... G01J 11/00
(Continued)

FOREIGN PATENT DOCUMENTS

FR 3 080 920 A1 11/2019

OTHER PUBLICATIONS

Bourdarot et al., Toward a large bandwidth photonic correlator for infrared heterodyne interferometry, 2020 (Year: 2020).*
(Continued)

*Primary Examiner* — Jai M Lee
(74) *Attorney, Agent, or Firm* — Maier & Maier, PLLC

(57) ABSTRACT

A wideband device for measuring the cross-correlation of a first signal and a second signal, includes a first frequency-shifting optical cavity comprising a first frequency shifter designed to shift the optical frequency of the first signal by a first frequency f1 per round trip in the first cavity, the first cavity having a first trip time τ1; a second frequency-shifting optical cavity comprising a second frequency shifter designed to shift the optical frequency of the second signal by a second frequency f2 per round trip in the second cavity, the second cavity having a second trip time τ2; the first and the second optical cavity being designed such that a maximum number of round trips of the first and the second signal in the first and the second cavity is equal to predetermined N, a detector designed to coherently detect the first signal transmitted by the first cavity and the second signal transmitted by the second cavity and generate a photocurrent (Tr) proportional to a luminous intensity detected by the detector, a low-pass filter designed to filter frequencies of the photo-
(Continued)

current that are lower than min (I), a processor configured to compute a Fourier transform of the photocurrent, so as to generate an output signal that is representative (II).

14 Claims, 5 Drawing Sheets

(56) References Cited

U.S. PATENT DOCUMENTS 12,078,527 B2 * 9/2024 Jiang .................. G01D 5/35329
2023/0417810 A1 * 12/2023 Guillet De Chatellus ..................
G01J 3/1256

OTHER PUBLICATIONS

Duran, et al., "Coherent multi-heterodyne spectroscopy using acousto-optic frequency combs", Optics Express vol. 26, Issue 11, pp. 13800-13809, 2018.
Bourdarot, et al., "Toward a large bandwidth photonic correlator for infrared heterodyne interferometry: A first laboratory proof of concept", Astronomy & Astrophysics (A&A), vol. 639, No. 53, p. A53, Jul. 2020.
Guillet De Chatellus, et al., "Optical real-time Fourier transformation with kilohertz resolutions", Optica, vol. 3, Issue 1, pp. 1-8, 2016.
Clement, et al., "Laser ranging using coherent pulse compression with frequency shifting loops", Optics Express, vol. 27, Issue 9, pp. 12000-12010, 2019.

* cited by examiner

WIDE-BAND DEVICE FOR MEASURING THE CROSS-CORRELATION OF SIGNALS

CROSS-REFERENCE TO RELATED APPLICATIONS

This application is a National Stage of International patent application PCT/EP2021/084233, filed on Dec. 3, 2021, which claims priority to foreign French patent application No. FR 2012782, filed on Dec. 7, 2020, the disclosures of which are incorporated by reference in their entirety.

FIELD OF THE INVENTION

The invention relates to the field of the analog processing of optical and radiofrequency signals, and more particularly to the analog processing of wideband optical and radiofrequency signals using frequency-shifting optical cavities.

BACKGROUND

Knowledge of the cross-correlation of signals is essential in many applications.

For example, in the optical field, cross-correlation of signals is used in astronomy (interferometry) and in OCT (Optical Coherent Tomography). In the latter case, a wideband optical signal is sent into a sample. An interferometric assembly (Michelson interferometer) combining the incident field and the backscattered field on a detector makes it possible to measure the delay, which corresponds to the maximum coherence between the sent wave and the reflected wave, in order to derive the position of the reflector. However, this type of assembly requires scanning a delay line and therefore exhibits significant acquisition times.

In the field of radiofrequency (RF) signals, signal correlation is used for many applications.

For example, in radio astronomy, the correlation of RF signals received by various antennas makes it possible to image the source. The problem with correlation in radio astronomy is particularly complex, because the number of signals to be cross-correlated exceeds several tens. This problem is also encountered in heterodyne optical interferometry, where the optical signal collected by the telescope is mixed with an optical local oscillator (CW laser), to produce an RF signal. The correlation of the optical fields is then transferred to the correlation of the RF signals.

Signal correlation may be carried out in two ways. The analog method consists in multiplying the two signals (in an RF mixer), to compute the value of $C(\tau) = \langle s_1(t) s_2(t+\tau) \rangle$ for a certain value of the delay $\tau$, and repeating the measurement while varying this delay. This technique is slow, requires a variable RF delay line, is limited by the bandwidth of the RF multipliers ("mixers")—in practice, 20 GHz—and is suitable only for stationary or sufficiently long signals.

Another way to compute the correlation of RF signals is to record them, and to then carry out a digital correlation. However, this technique requires significant digital means, especially when the spectral width of the signal to be analyzed exceeds GHz. Indeed, acquiring the signal at such frequencies requires acquisition techniques (digital-to-analog converters) and processing techniques that are highly cumbersome, costly and energy-intensive. It is possible to disperse the signal into smaller spectral bands, and to carry out the correlation operations band by band, but at the expense of additional complexity. The ALMA correlator thus uses 134 million processors simultaneously. Moreover, the convolution operation has to be carried out in real time, thereby mobilizing significant resources.

Another application of signal correlation is the location of transmitters (or passive radar). By measuring the delay between two signals transmitted by the same source (that is to say by computing their correlation product), it is possible to derive the position of the transmitter by triangulation. In the absence of an analog electronic correlator, the correlation is carried out digitally, with the drawbacks described above (constraints on the acquisition of signals and the processing thereof).

Another application of analog correlation of RF signals is that of compression of radar pulses by matched filtering. This concept makes it possible, in radar for example, to send a long (therefore high-energy) signal to a distant target, and to measure the return signal by correlating it with the sent signal. The result of this correlation as a function of the delay produces a peak that may be much shorter ("compressed") than the sent signal, and thus stand out from background noise. This pulse compression technique may be carried out digitally, but in this case too, it is necessary to digitize the signals, this being problematic when the spectral width thereof exceeds several GHz.

As an alternative, the compression may be carried out using the property of a Fourier transform of a cross-correlation of functions g and f as follows: $F[f^* g](u) = F(\overline{f(-t)}) \cdot F(g(t))$. The compression is thus carried out using matched filtering, that is to say a spectral filter, the Fourier transform of which is the inverse, by time reversal, of one of the signals to be correlated. This technique is possible when the reference signal is known and does not vary, the implementation of a real time-tunable spectral filter not being conceivable with current technologies.

SUMMARY OF THE INVENTION

The invention aims to overcome some of the abovementioned problems from the prior art by using two frequency-shifting optical cavities in order to cross-correlate two RF or optical signals without requiring a scan and with a high bandwidth.

To this end, one subject of the invention is a wideband device for measuring the cross-correlation of a first signal and a second signal, comprising:
  a first source designed to generate said first signal $s_1(t)$;
  a second source designed to generate said second signal $s_2(t)$;
  a first frequency-shifting optical cavity comprising a first frequency shifter designed to shift the optical frequency of the first signal by a first frequency $f_1$ per round trip in said first cavity, said first cavity having a first trip time $\tau_1$;
  a second frequency-shifting optical cavity comprising a second frequency shifter designed to shift the optical frequency of the second signal by a second frequency $f_2$ per round trip in said second cavity, said second cavity having a second trip time $\tau_2$;
  the first and the second optical cavity being designed such that a maximum number of round trips of the first and the second signal in the first and the second cavity is equal to predetermined N
  a detector designed to coherently detect the first signal transmitted by the first cavity and the second signal transmitted by the second cavity and generate a photocurrent proportional to a luminous intensity detected by said detector, a low-pass filter designed to filter frequencies of the photocurrent that are lower than $$\min\left(\frac{f_1}{2}; \frac{f_2}{2}\right),$$

a processor configured to compute a square modulus of a Fourier transform of said photocurrent, so as to generate an output signal that is representative of a real-time cross-correlation between the first signal and the second signal, $C(\tau) = \langle s_1(t)s_2^*(t-\tau) \rangle$, with $\tau = n(\tau_1 - \tau_2), n \in [1, N]$.

According to some particular embodiments of the invention:

the device comprises a monochromatic laser, the first and the second sources respectively comprising: a first and a second RF source designed to generate a first and a second RF signal $s1(t)$, $s2(t)$ and a first and a second modulator designed to amplitude-modulate, using said first and said second RF signal $s1(t)$, laser radiation generated by said continuous-wave laser, so as to form said first and said second signal;

the first source is configured to generate a plurality of $i \in [1, p]$ first sub-signals $s_{1,i}(t)$ that are spatially and temporally superposed so as to form the first signal, each i first sub-signal having a first center frequency $f_{1,i}$ different from the others, and wherein the second source is configured to generate a plurality of $j \in [1, q]$ second sub-signals $s_{2,j}(t)$ that are spatially and temporally superposed so as to form the second signal, each j second sub-signal having a second center frequency $f_{2,j}$ different from the others, said output signal then being a cross-correlation of each first sub-signal with each second sub-signal, $C_{i,j}(\tau) = \langle s_{1,i}(t)s_{2,j}^*(t-\tau) \rangle$, with $\tau = n(\tau_1 - \tau_2), n \in [1, N]$;

the first and the second cavity are designed to verify the condition $f_1 \times \tau_1 = f_2 \times \tau_2$, modulo 1, said processor then being configured to compute a Fourier transform of said photocurrent, so as to generate an output signal that is the real part of a real-time cross-correlation between the first signal and the second signal, $C(\tau) = \langle s_1(t)s_2^*(t-\tau) \rangle$, with $\tau = n(\tau_1 - \tau_2), n \in [1, N]$;

the first and the second cavity are designed such that $f_1 \times \tau_1 \neq f_2 \times \tau_2$ modulo 1, said processor furthermore being configured to compute a square modulus of a Fourier transform of said photocurrent, the output signal (SS) then corresponding to a square modulus of a real-time cross-correlation between the first signal and the second signal, $|C(\tau)|^2 = |\langle s_1(t)s_2^*(t-\tau) \rangle|^2$, with $\tau = n(\tau_1 - \tau_2), n \in [1, N]$.

the first and the second cavity respectively comprise a first and a second amplifier designed to compensate for the losses induced respectively by the first and the second cavity;

the first frequency shifter is a first acousto-optic modulator excited by a first local oscillator designed to vary said first shift frequency and wherein the second frequency shifter is a second acousto-optic modulator excited by a second local oscillator designed to vary said second shift frequency;

the first cavity comprises a first controllable delay line designed to vary the first trip time $\tau_1$ and wherein the second cavity comprises a second controllable delay line designed to vary the second trip time $\tau_2$;

the first and the second cavity are fiber ring cavities comprising respectively a first and a second doped fiber amplifier and a first and a second optical bandpass filter configured to set said maximum number N of round trips in the first and the second cavity;

the device comprises stabilizing means for stabilizing the first and the second cavity that are designed to maintain, over time, the coherence of said first signal transmitted by the first cavity with said second signal transmitted by the second cavity;

the device comprises a single ring cavity, said device furthermore comprising:

a first coupler designed to inject said first signal into said single cavity in a first direction, a second coupler designed to inject said second signal into said single cavity in a second direction, said first cavity corresponding to the single cavity into which the first signal is injected in the first injection direction, said second cavity corresponding to the single cavity into which the second signal is injected in the second injection direction, said single ring cavity comprising:

a first circulator designed to direct the first signal to a first controllable delay line designed to vary the first trip time $\tau_1$ and comprising said first frequency shifter a second circulator designed to direct the second signal to a second controllable delay line designed to vary the second trip time $\tau_1$ and comprising said second frequency shifter a doped fiber amplifier an optical bandpass filter configured to set said maximum number N of round trips the first and the second cavity are configured such that $$\frac{1}{|\tau_1 - \tau_2|} \geq 40 \text{ GHz};$$

the first and the second cavity are configured such that N is greater than 200.

Another subject of the invention is a method for measuring the cross-correlation of a first and a second signal using a first frequency-shifting optical cavity having a first trip time $\tau_1$ and a second frequency-shifting optical cavity comprising a second frequency shifter having a second trip time $\tau_2$, a maximum number of round trips of the first signal and of the second in the first and the second cavity being equal to predetermined N, said method comprising the following steps:

A. generating said first signal $s_1(t)$ and said second signal $s_2(t)$;

B. injecting said first signal into the first frequency-shifting optical cavity and shifting the optical frequency of the first signal by a first frequency $f_1$ per round trip in said first cavity, injecting said second signal into the second frequency-shifting optical cavity and shifting the optical frequency of the second signal by a second frequency $f_2$ per round trip in said second cavity;

C. coherently detecting the first signal transmitted by the first cavity and the second signal transmitted by the second cavity and generating the photocurrent proportional to the detected luminous intensity, a maximum number of round trips of the first and the second signal respectively in the first and the second cavity before they are transmitted being equal to predetermined N, and D. filtering frequencies of the photocurrent that are lower than $$\min\left(\frac{f_1}{2}; \frac{f_2}{2}\right),$$

E. computing a square modulus of a Fourier transform of said filtered photocurrent, so as to generate an output signal that is representative of a real-time cross-correlation between the first signal and the second signal, $C(\tau) = \langle s_1(t)s_2^*(t-\tau)\rangle$, with $\tau = n(\tau_1 - \tau_2), n \in [1, N]$.

BRIEF DESCRIPTION OF THE DRAWINGS

Other features, details and advantages of the invention will become apparent on reading the description given with reference to the appended drawings, which are given by way of example and in which, respectively.

References to the figures, when they are identical, correspond to the same elements.

References to the figures, when they are identical, correspond to the same elements.

The elements are not to scale in the figures unless indicated otherwise.

DETAILED DESCRIPTION

Figure 1:
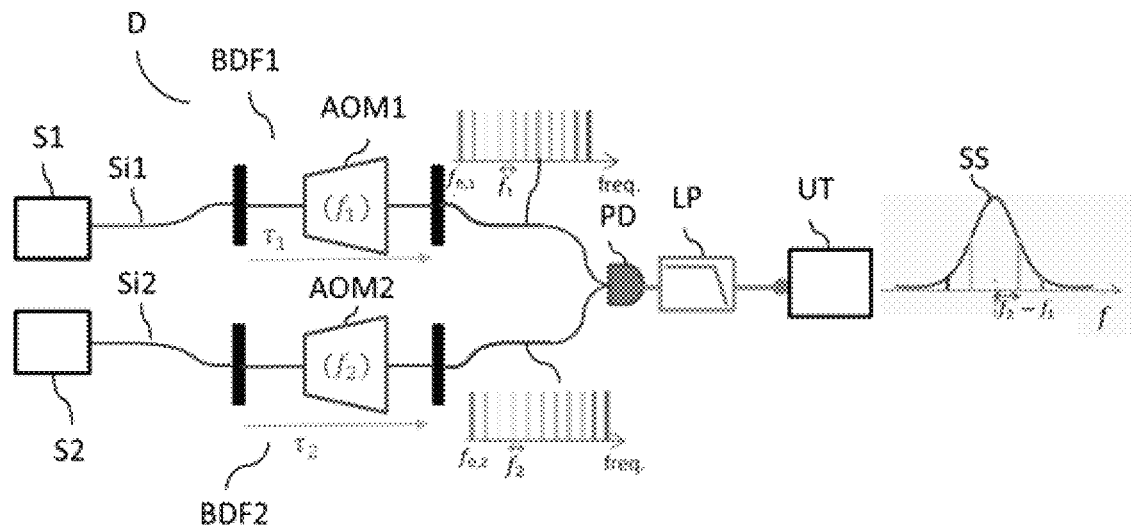
FIG. 1 shows a schematic view of a wideband cross-correlation measurement device according to the invention.

FIG. 1 is a schematic depiction of a signal cross-correlation measurement device D according to the invention. As will be explained later, by virtue of a first frequency-shifting optical cavity BDF1 and a second frequency-shifting optical cavity BDF2, the device D of the invention makes it possible to determine a representation in the frequency space of the square modulus of the cross-correlation of two or more than two signals. Moreover, subject to a particular condition linking these cavities, the device of the invention makes it possible to determine a representation in the frequency space of the cross-correlation of two or more than two signals.

"Wideband" is understood here to mean that the bandwidth of the device is greater than or equal to 20 GHz, preferably greater than or equal to 40 GHz. The parameters controlling the bandwidth of the device will be explained later in the description.

The device D of the invention comprises a first radiation source S1 designed to generate a first signal of interest $s_1(t)$ Si1 and a second radiation source S2 designed to generate a second signal of interest $s_2(t)$ Si2.

The first signal Si1 is injected into the first frequency-shifting optical cavity BDF1. This cavity BDF1 has a first trip time $\tau_1$ (round trip time in the cavity) and comprises a first frequency shifter AOM1 designed to shift the optical frequency of the first signal by a first frequency $f_1$ per round trip in the first cavity.

Similarly, the second signal Si2 is injected into the second frequency-shifting optical cavity BDF2, which has a second trip time $\tau_2$ and which comprises a second frequency shifter AOM2 designed to shift the optical frequency of the second signal by a second frequency $f_2$ per round trip in the second cavity.

The first optical cavity BDF1 and the second optical cavity BDF2 may, indiscriminately and without departing from the scope of the invention, be a linear cavity or a ring cavity, and a free-space cavity or a fiber cavity.

Essentially, the first and the second optical cavity are designed such that a maximum number of round trips of the signal in the first and the second cavity is equal to a predetermined number N. Thus, calling $f_0$ the center frequency of the signal of interest, the first and the second cavity each generate a frequency comb comprising respectively the frequencies $f_0 + n \times f_1$ and $f_0 + n \times f_2$, with $n \in [1; N]$. In concrete terms, the first and the second cavity produce replicas of the signal of interest, which are both time-shifted (by multiples of $\tau_1$ and $\tau_2$ respectively) and frequency-shifted (by multiples of $f_1$ and $f_2$ respectively).

According to one embodiment, in order to control this maximum number of round trips N, the first and the second loop respectively comprise a first and a second bandpass filter BP1, BP2 (not shown in FIG. 1 but visible in FIGS. 3 and 4), of bandwidth suitable for transmitting respectively the frequencies $f_0 + n \times f_1$ and $f_0 + n \times f_2$, with $n \in [1; N]$.

The first frequency shifter AOM1 and the second frequency shifter AOM2 are preferably acousto-optic modulators controlled by a first local oscillator OL1 and a second local oscillator OL2 (not shown in the figures). The excitation frequency generated by the first local oscillator and the second local oscillator makes it possible to vary the first frequency $f_1$ and the second frequency $f_2$. As an alternative, the first and the second frequency shifter are single-sideband electro-optic modulators (or SSB MZM, for single-sideband Mach Zehnder modulator).

The device D furthermore comprises a detector PD designed to coherently detect the first signal Si1 transmitted by the first cavity and the second signal Si2 transmitted by the second cavity. The detector PD is typically a photodiode or any other photodetector known to those skilled in the art. Preferably, the detector PD is formed by balanced photodiodes in order to detect very small light signal variations.

This detector PD detects, in real time, a luminous intensity that corresponds to the coherent summation of all replicas of the signal of interest that are both time-shifted and frequency-shifted (the frequency combs) by the first and the second cavity, and then generates a photocurrent Tr proportional to this detected luminous intensity. For the device to work, it is essential that the first signal Si1 transmitted by BDF1 is coherent with the signal Si2 transmitted by BDF2.

The photocurrent Tr is then filtered by a low-pass analog filter LP designed to let through frequencies of the photocurrent that are lower than the Nyquist frequencies associated with the first signal Si1 and with the second signal Si2, that is to say min $(f_1/2; f_2/2)$.

Finally, the device D comprises a processor UT configured to compute a Fourier transform (FT) of the photocurrent filtered by the filter LP, thus generating an output signal SS. By way of this output signal, the device D makes it possible to determine a frequency representation of the cross-correlation of $s_1(t)$ with $s_2(t)$ sampled by N points. More precisely, SS is representative of a real-time cross-correlation between the first signal and the second signal, that is to say $C(\tau) = \langle s_1(t) s_2^*(t-\tau) \rangle$, with $\tau = n(\tau_1 - \tau_2) = n \cdot \Delta n$, $n \in [1,N]$.

Indeed, the inventors have demonstrated that the photocurrent Tr is expressed in the following form:

$$I(t) = \sum_n C(t, n\Delta\tau) e^{-i2\pi n \Delta f t} e^{-i\pi (f_1 \tau_1 - f_2 \tau_2) n^2} \quad \text{(Eq. 1)}$$

According to a first variant of the invention, the first and the second cavity are designed to verify the condition $f_1 \times \tau_1 = f_2 \times \tau_2$ modulo 1. In this first variant, the output signal SS then corresponds to the real part of a real-time cross-correlation between the first signal and the second signal, $C(\tau) = \langle s_1(t) s_2^*(t-\tau) \rangle$, with $\tau = n(\tau_1 - \tau_2), n \in [1,N]$. The FT of the photocurrent Tr therefore makes it possible to directly access the real part of the cross-correlation function, at the time t, between Si1 and Si2 sampled by N points per step $\Delta\tau = (\tau_1 - \tau_2)$, that is to say $\tilde{I}(n\Delta f, t) \propto C(t, n\Delta\tau)$.

According to a second variant of the invention, the first and the second cavity are designed such that $f_1 \times \tau_1 \neq f_2 \times \tau_2$ modulo 1. The processor is then configured to compute a square modulus of a Fourier transform of the photocurrent Tr, the output signal SS then corresponding to a square modulus of a real-time cross-correlation between the first signal and the second signal, $|C(\tau)|^2 = |\langle s_1(t) s_2^*(t-\tau) \rangle|^2$, with $\tau = n(\tau_1 - \tau_2), n \in [1,N]$. The square modulus of the FT of the photocurrent Tr therefore makes it possible to access the square modulus of the cross-correlation function, at the time t, between Si1 and Si2 sampled by N points per step $\Delta\tau = (\tau_1 - \tau_2)$.

For the sake of clarity, the derivation of the equations explaining these results is presented at the end of the present description.

One important advantage of the device of the invention is that it thus makes it possible to measure the real part of the cross-correlation (or the square modulus of the cross-correlation) of two signals instantaneously sampled by N points without the need to scan a delay line. The acquisition is therefore faster, and any problems related to the fluctuation of the signals during acquisition are overcome. In the invention, it is not necessary for the signals to be stationary signals. In addition, the invention makes it possible to obtain the cross-correlation function through a simple FT of a relatively slow signal (sampled at less than a few tens of Msample/s), an operation that is not costly in terms of computational resources.

For the sake of conciseness, in the remainder of the document, it will simply be said that the device measures the cross-correlation of two signals. It will be understood that this expression covers the first variant of the invention and the specific case where $f_1 \times \tau_1 = f_2 \times \tau_2$, modulo 1 and the processor generates an output signal that corresponds to the real part of the cross-correlation, and the second variant of the invention, that is to say the more general case where $f_1 \times \tau_1 \neq f_2 \times \tau_2$, modulo 1 and the processor generates an output signal that corresponds to the square modulus of the cross-correlation.

Preferably, the low-pass filter LP is designed to filter frequencies of the photocurrent that are lower than a value min $[N \times |f_1 - f_2|; f_1/2; f_2/2)]$, before the computing of the FT of the photocurrent by the processor UT. Filtering frequencies lower than $N \times |f_1 - f_2|$ makes it possible, if this value is lower than the Nyquist frequencies $f_1/2$; $f_2/2$, to process the photocurrent Tr with a processor comprising slower processing electronics (typically 50 Msample/s).

The temporal resolution of the device (that is to say the time taken by the system to compute and produce the correlation function) is equal to $\tau_1 - \tau_2$. It should be noted that the data are obtained in real time, that is to say that the determined cross-correlation function is updated every period $\tau_1 - \tau_2$. In the device D of the invention, the bandwidth is equal to $LS_{in} = 1/(\tau_1 - \tau_2)$. This characteristic is of great interest because, by minimizing the difference $\tau_1 - \tau_2$, it is possible to maximize the bandwidth of the device D. Thus, according to one embodiment, the temporal resolution is less than ten picoseconds, thereby making it possible to correlate signals with a spectral width of several tens of GHz. As an alternative, according to another embodiment, $\tau_1 - \tau_2$ is a few hundred microseconds, so as to allow the correlation of spectrally fine signals (typically a few MHz).

In addition, the temporal resolution $\tau_1 - \tau_2$ also corresponds to the sampling period of the cross-correlation function $C(\tau) = \langle s_1(t) s_2^*(t-\tau) \rangle$, with $\tau = n(\tau_1 - \tau_2), n \in [1,N]$. Preferably, in order to sample the cross-correlation function with enough points, the first and the second cavity are configured such that a maximum number of round trips N is greater than 200, preferably greater than 500.

According to one embodiment, the first cavity comprises a first controllable delay line DL1 (not shown) designed to vary the first trip time $\tau_1$ and/or the second cavity comprises a first controllable delay line DL2 (not shown) designed to vary the second trip time $\tau_2$. It is thus possible to control the difference $(\tau_1 - \tau_2)$ in order to control the temporal resolution and the bandwidth $LS_{in}$ of the device D. Preferably, the difference $(\tau_1 - \tau_2)$ is such that the bandwidth $LS_{in}$ is greater than or equal to 20 GHz, preferably greater than or equal to 40 GHz.

One advantage of the embodiments of the invention comprising delay lines DL1, DL2 and/or frequency shifters AOM1, AOM2 that make it possible to vary $f_1$ and $f_2$ is therefore that of making it possible to control the scale of the correlation function (set by $\Delta f / \Delta\tau$, with $\Delta f = f_1 - f_2$) and to easily verify the condition $f_1 \times \tau_1 = f_2 \times \tau_2$ while maximizing bandwidth.

It should be noted that, in the embodiments of the invention in which the first and the second cavity BDF1, BDF2 respectively comprise a first and second bandpass filter BP1, BP2, the bandwidth $LS_{in}$ is equal to a spectral width $LS_{BP}$ of the first and of the second bandpass filter when this spectral width $LS_{BP}$ is less than $1/(\tau_1 - \tau_2)$. In other words, the bandwidth is equal to $LS_{in} = \min(1/(\tau_1 - \tau_2); LS_{BP})$.

According to one embodiment, the first and the second cavity respectively comprise a first and a second amplifier EDFA1, EDFA2 (not shown in FIG. 1 but visible in FIG. 4) that are designed to compensate for the losses induced by the first and the second cavity.

Figure 2:
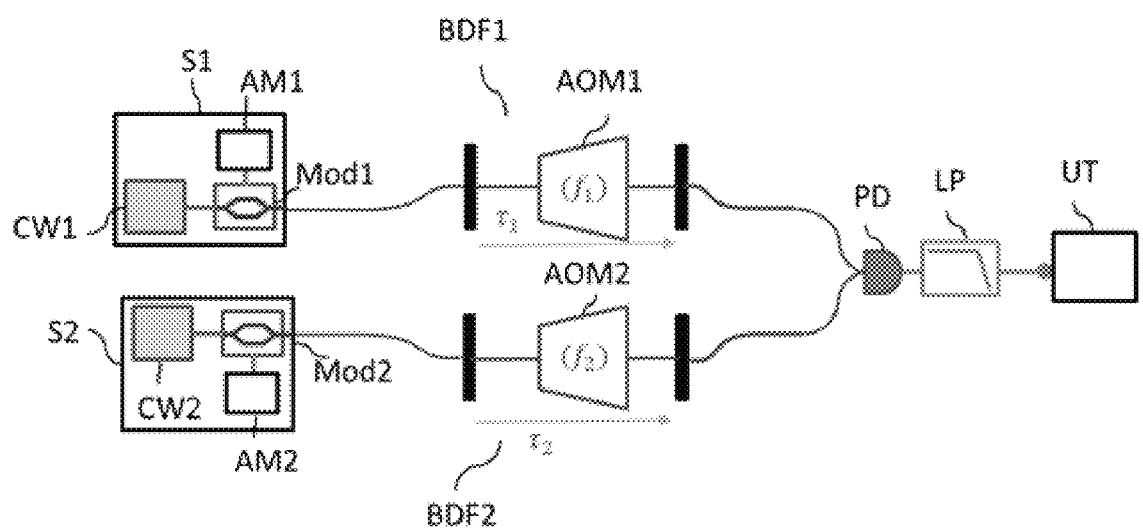
FIG. 2 shows a schematic view of a wideband cross-correlation measurement device according to a first embodiment of the invention.

According to a first embodiment of the invention, illustrated in FIG. 2, the first source S1 comprises a first monochromatic continuous-wave laser CW1, a first source AM1 designed to generate a first RF signal $s_1(t)$, and a first modulator Mod1 designed to amplitude-modulate, using the first RF signal $s_1(t)$, the laser radiation generated by the first continuous-wave laser so as to form the first signal of interest. Similarly, the second source S2 comprises a second monochromatic continuous-wave laser CW2, a second source AM2 designed to generate a second RF signal $s_2(t)$, and a second modulator Mod2 designed to amplitude-modulate, using the second RF signal $s_2(t)$, the laser radiation generated by the second continuous-wave laser so as to form the second signal of interest. As an alternative, the device comprises a single monochromatic laser that is amplitude-modulated by the first and the second RF source so as to respectively form the first and the second signal of interest.

In the first embodiment of the invention, the device D makes it possible to determine the cross-correlation of the first signal of interest with the second signal of interest. When the first and the second laser CW1, CW2 have a coherence time long enough for the laser radiation to remain coherent within the cavities BDF1, BDF2 respectively (typically of the order of around a hundred µs), then the output signal SS is the cross-correlation of the first RF signal $s_1(t)$ with the second RF signal $s_2(t)$ sampled by N points with a step $\tau_1-\tau_2$. This first embodiment is of particular interest given the bandwidth $LS_{in}$ of the device, which may be greater than 40 GHz while at the same time obtaining a cross-correlation function with a very short acquisition time, these values not being unachievable using the devices from the prior art carrying out the cross-correlation of RF signals.

In a second embodiment, the first and the second source S1, S2 are optical sources generating a first and a second signal of interest Si1, Si2 in the form of light rays $s_1(t)$, $s_2(t)$ for example a laser source. In the second embodiment of the invention, the device D makes it possible to determine a cross-correlation of the first signal with the second signal sampled by N points with a step $\tau_1-\tau_2$.

Figure 3:
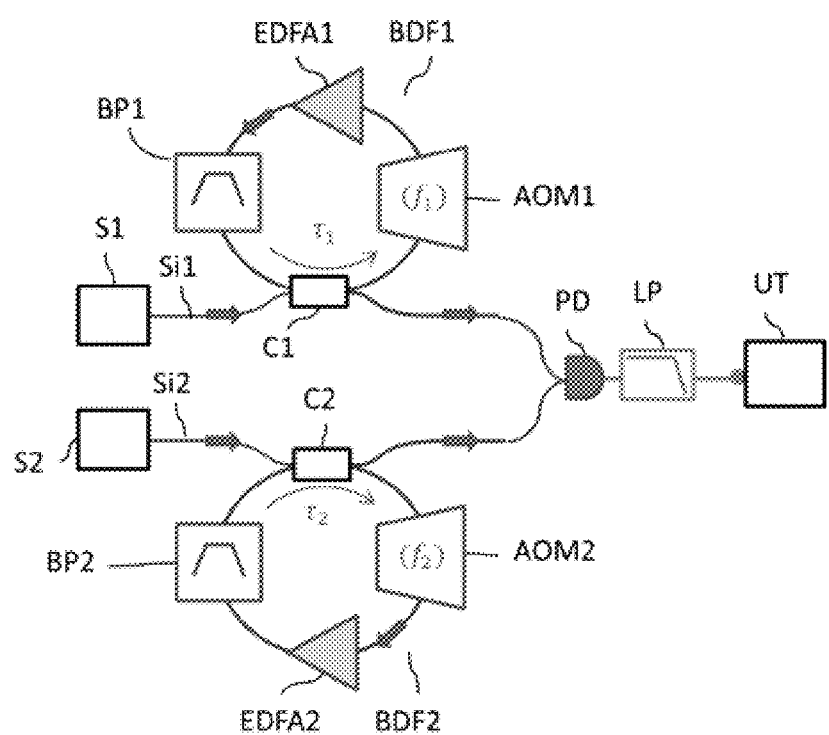
FIG. 3 shows a schematic view of a wideband cross-correlation measurement device according to a second embodiment of the invention.

FIG. 3 schematically illustrates a third embodiment, compatible with the first and the second embodiment, in which the entire optical path of the first and the second signal of interest Si2, Si2 from the source S1, S2 to the detection by the photodiode is fiber-based. The alignment of the device is thus simplified, and the device is less sensitive to impacts and vibrations. In this third embodiment, the first and the second cavity BDF1, BDF2 are fiber ring cavities comprising, respectively, a first and a second doped fiber amplifier EDFA1, EDFA2 and a first and a second optical bandpass filter BP1, BP2. The first signal Si1 is injected into the first cavity BDF1 by way of a fiber coupler C1 and the second signal Si2 is injected into the second cavity BDF2 by way of a fiber coupler C2.

As explained above, the first and the second doped fiber amplifier EDFA1, EDFA2, for example EDFAs (Erbium Doped Fiber Amplifiers), are designed to compensate for the losses induced in the cavities BDF1, BDF2. The optical bandpass filters BP1, BP2 are configured to set said maximum number N of round trips in the first and the second cavity and to limit the noise resulting from the amplified spontaneous emission of the doped fiber amplifiers.

Advantageously, in the third embodiment, the device D comprises stabilization means ST (not shown) for stabilizing the first and the second cavity BDF1, BDF2 that are designed to maintain, over time, the coherence between the first signal transmitted by the first cavity and the second signal transmitted by the second cavity. The stabilization device makes it possible to ensure that the radiation transmitted by the two cavities BDF1, BDF2 is mutually coherent. Such a device is well known to those skilled in the art and is for example described in "Coherent multi-heterodyne spectroscopy using acousto-optic frequency combs," Opt. Express 26, 13800-13809 (2018).

Figure 4:
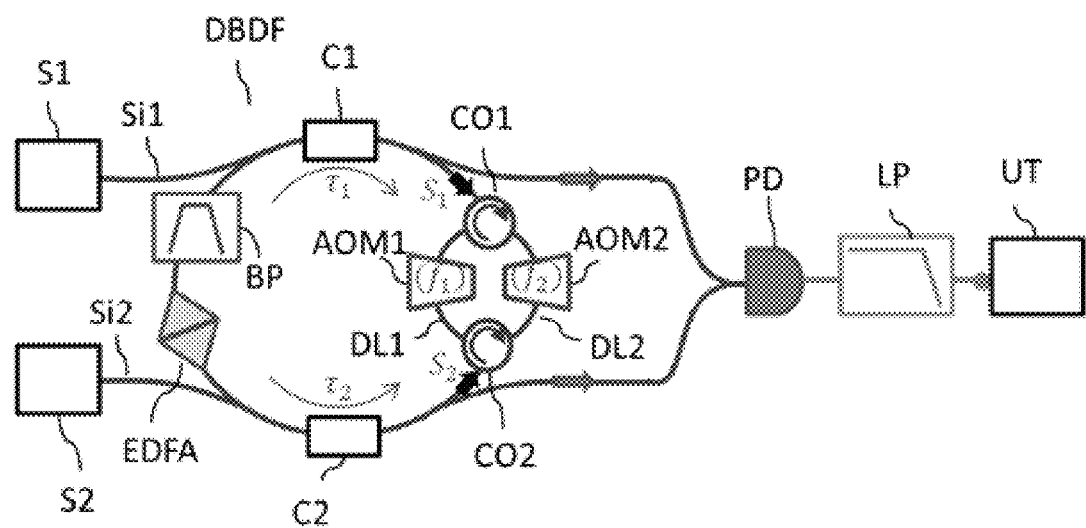
FIG. 4 shows a schematic view of a wideband cross-correlation measurement device according to a third embodiment of the invention.

FIG. 4 schematically illustrates a fourth embodiment, compatible with the first and the second embodiment, which constitutes an alternative to the third embodiment. This fourth embodiment aims to overcome the problem of maintaining coherence over time between the first signal Si1 and the second signal Si2 transmitted by the first and the second cavity. For this purpose, the device comprises a single fiber ring cavity BDF configured to form the first and the second cavity BDF1, BDF2 depending on the injection direction. This configuration with a single counter-propagating ring cavity makes it possible to limit the effects of fiber length fluctuations (vibrations, thermal drifts, etc.), which may be different between the first and the second cavity of the third embodiment, and which lead to a loss of coherence as the round trips progress. It also makes it possible to reduce the number of optical components needed.

Similarly to the third embodiment, in the device D of the fourth embodiment, the entire optical path of the signal of interest from the first and the second source S1, S2 to the detection by the photodiode is fiber-based. The device D comprises a first fiber coupler C1 designed to inject the first signal Si1 into the single cavity BDF in a first direction $S_1$. In addition, the device D comprises a second fiber coupler C2 designed to inject the second signal Si2 into the single cavity BDF in a second direction $S_2$. The cavity BDF comprises:
- a first circulator CO1 designed to direct the first signal Si1 to a first delay line DL1 comprising the first frequency shifter AOM1,
- a second circulator CO2 designed to direct the second signal Si2 to the second delay line DL2 comprising the second frequency shifter AOM2,
- a bidirectional doped fiber amplifier EDFA (operating in both directions),
- an optical bandpass filter BP configured to set said maximum number N of round trips. Thus, the first cavity BDF1 corresponds to the single cavity BDF into which the first signal Si1 is injected in the first injection direction $S_1$ and the second cavity BDF2 corresponds to the single cavity BDF into which the second signal Si2 is injected in the second injection direction $S_2$.

As an alternative, according to one variant of the fourth embodiment, instead of a single amplifier EDFA and a single optical bandpass filter BP common to the first signal Si1 and to the second signal Si2, the first delay line DL1 comprises a first amplifier EDFA1 and an optical bandpass BP1 and the second delay line DL1 comprises a second amplifier EDFA2 and an optical bandpass BP2

Figure 5:
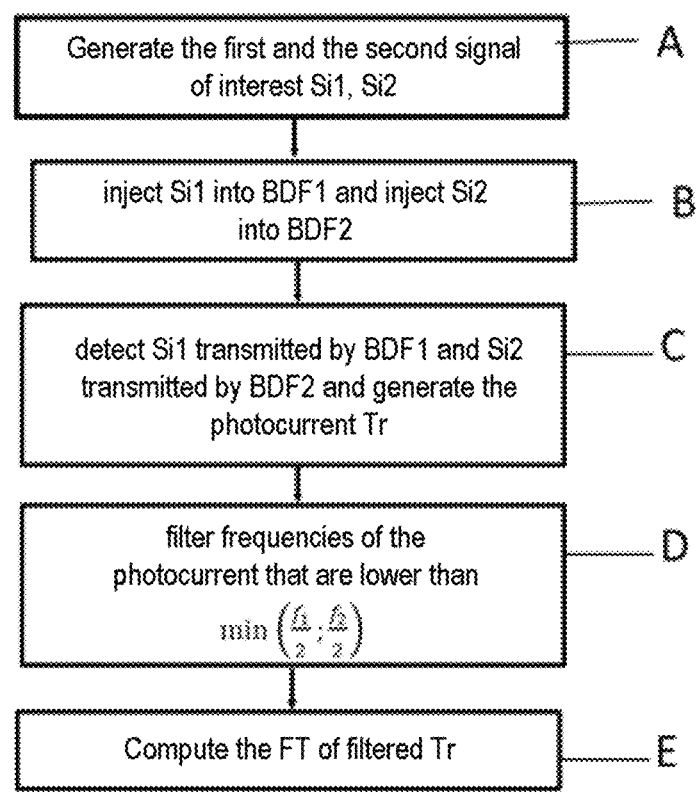
FIG. 5 shows a cross-correlation measurement method according to the invention.

Another subject of the invention is a method for measuring the real part or the square modulus of the cross-correlation of a first and a second signal of interest, implemented by the device D of the invention. FIG. 5 schematically illustrates this method.

The method of FIG. 5 comprises the following steps:
A. generating the first and the second signal of interest Si1, Si2;
B. injecting the first signal Si1 into the first frequency-shifting optical cavity BDF1 and shifting the optical frequency of the first signal by a first frequency $f_1$ per round trip in the first cavity, and injecting the second signal into the second frequency-shifting optical cavity BDF2 and shifting the optical frequency of the second signal Si2 by a second frequency $f_2$ per round trip in the second cavity;
C. coherently detecting the sum of the first signal transmitted by the first cavity and the second signal transmitted by the second cavity and generating the photocurrent Tr proportional to the detected luminous intensity, D. filtering frequencies of the photocurrent that are lower than $$\min\left(\frac{f_1}{2}; \frac{f_2}{2}\right),$$

E. computing the Fourier transform of the filtered photocurrent, so as to generate the output signal SS that is representative in the frequency space of the real-time cross-correlation between the first signal and the second signal, $C(\tau)=\langle s_1(t)s_2^*(t-\tau)\rangle$, with $\tau=n(\tau_1-\tau_2), n\in[1, N]$.

The method of FIG. 5 has the notable advantage of being wideband and of not requiring a scan in order to sample the cross-correlation function.

According to a first variant of the method of FIG. 5, the first and the second cavity are designed to verify the condition $f_1\times\tau_1=f_2\times\tau_2$, modulo 1 and step E then consists in computing a Fourier transform of said photocurrent, so as to generate an output signal SS that is the real part of a real-time cross-correlation between the first signal and the second signal, $C(\tau)=\langle s_1(t)s_2^*(t-\tau)\rangle$, with $\tau=n(\tau_1-\tau_2), n\in[1, N]$.

According to a second variant of the method of FIG. 5, the first and the second cavity are designed such that $f_1\times\tau_1\neq f_2\times\tau_2$ modulo 1, step E furthermore comprising computing the square modulus of a Fourier transform of said photocurrent, the output signal SS then corresponding to a square modulus of a real-time cross-correlation between the first signal and the second signal, $|C(\tau)|^2=|\langle s_1(t)s_2^*(t-\tau)\rangle|^2$, with $\tau=n(\tau_1-\tau_2), n\in[1, N]$.

Figure 6:
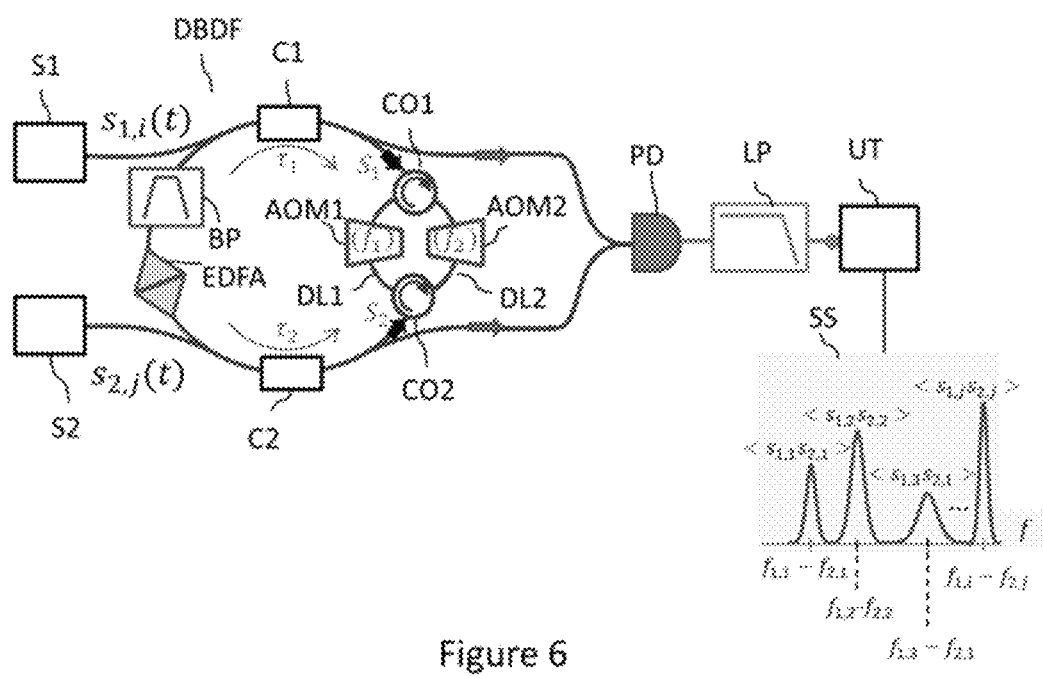
FIG. 6 shows a schematic view of a wideband cross-correlation measurement device according to a fourth embodiment of the invention.

FIG. 6 shows a fifth embodiment in which the first source S1 is configured to generate a plurality of $i\in[1, p]$ first sub-signals $s_{1,i}(t)$ that are spatially and temporally superposed so as to form the first signal Si1, each i first sub-signal having a first center frequency $f_{1,i}$ different from the others. Similarly, the second source is configured to generate a plurality of $j\in[1,q]$ second sub-signals $s_{2,j}(t)$ that are spatially and temporally superposed so as to form the second signal, each j second sub-signal having a second center frequency $f_{2,j}$ different from the others. The output signal SS is thus a cross-correlation of each first sub-signal with each second sub-signal, $C_{i,j}(\tau)=\langle s_{1,i}(t)s_{2,j}^*(t-\tau)\rangle$, with $\tau=n(\tau_1-\tau_2), n\in[1,N]$. Preferably, the integration time, the first center frequencies $f_{1,i}$ and the second center frequencies $f_{2,i}$ and the parameters $\tau_1, \tau_2$ are adapted so that there is no overlap of the various cross-correlation functions $C_{i,j}(\tau)=\langle s_{1,i}(t)s_{2,j}^*(t-\tau)\rangle$, with $\tau=n(\tau_1-\tau_2), n\in[1, N]$.

It will be understood that these first and second sub-signals may be either optical signals, as in the second embodiment of the invention, or RF signals amplitude-modulating continuous-wave laser radiation CW, as in the first embodiment of the invention.

The use of a large number of signals of interest is of particular interest in applications in optical interferometry and radio astronomy, in which it is crucial to correlate multiple signals in order to locate the position of a transmitter.

The equations demonstrating that the output signal SS is the cross-correlation function of Si1 and Si2 are derived below $f_0$ denotes the frequency of the injection laser, $\tau_1, \tau_2$ denote the trip times in the loops, $f_1, f_2$ denote the shift frequencies per trip, $s_1(t)$ denotes the first signal of interest and $s_2(t)$ denotes the second signal of interest.

The electric fields at the output of the first and the second cavity are respectively:

$$E_1(t) = \sum_{n=0}^{N} s_1(t-n\tau_1)E_0 e^{i2\pi f_0 t} e^{i2\pi n f_1 t} e^{-i\pi f_1 \tau_1 n^2} \quad (1)$$

$$E_2(t) = \sum_{n=0}^{N} s_2(t-n\tau_2)E_0 e^{i2\pi f_0 t} e^{i2\pi n f_2 t} e^{-i\pi f_2 \tau_2 n^2} \quad (2)$$

The intensity detected by PD is:

$$I(t)=w(t)*E_1(t)E_2^*(t) \quad (3)$$

where w(t) is a time window centered at t (linked to the response of the detection) and * is the convolution product. Omitting the term $E_0 E_0^*$ gives $$I(t) = w(t)*\sum_{n,m} s_1(t-n\tau_1)s_2(t-m\tau_2)e^{i2\pi(nf_1-mf_2)t}e^{-i\pi(f_1\tau_1 n^2-f_2\tau_2 m^2)} \quad (4)$$

$$I(t) = \int w(t-t')\sum_{n,m} s_1(t'-n\tau_1)s_2(t'-m\tau_2)e^{i2\pi(nf_1-mf_2)t'}e^{-i\pi(f_1\tau_1 n^2-f_2\tau_2 m^2)}dt' \quad (5)$$

The frequencies $f_1$ and $f_2$ are chosen such that $\Delta f=f_2-f_1\leq f_1/2N, f_2/2N$. The duration of the window w(t) is chosen to be of the order of $1/N\Delta f$. It is therefore greater than $2/f_1$ and $2/f_1$. Thus, only pairs of integers (n, m=n) have a non-zero contribution to the integral.

It is assumed here that $f_1\tau_1=f_2\tau_2$. This then gives:

$$I(t)=\int w(t-t')\Sigma_n s_1(t'-n\tau_1)s_2(t'-n\tau_2)e^{-i2\pi n\Delta ft'}dt' \quad (6)$$

Over the duration of the window, $e^{-i2\pi n\Delta ft'}$ may be assimilated to $e^{-i2\pi n\Delta ft}$ because the duration of the window is shorter than the period of the functions $e^{-i2\pi n\Delta ft'}$.

This thus gives:

$$I(t) = \sum_n e^{-i2\pi n\Delta ft}\int w(t-t')s_1(t'-n\tau_1)s_2(t'-n\tau_2)dt' \quad (7)$$

$$I(t) = \sum_n \langle s_1(t-n\tau_1)s_2(t-n\tau_2)\rangle e^{-i2\pi n\Delta ft} \quad (8)$$

where $\langle \rangle$ represents the average measured over the duration of the window.

Shifting the time origin gives $$I(t)=\Sigma_n \langle s_1(t)s_2(t-n\Delta\tau)\rangle e^{-i2\pi n\Delta ft} \quad (9)$$

where $\Delta t=\tau_2-\tau_1$. The cross-correlation function at the time t for the delay T is defined: $C(t, T)=\langle s_1(t)s_2(t-T)\rangle$.
In other words:

$$I(t) = \sum_n C(t, n\Delta\tau)e^{-i2\pi n\Delta ft}e^{-i\pi(f_1\tau_1-f_2\tau_2)n^2} \quad (10)$$

The values of the Fourier transform of I(t) at the frequencies $n\Delta f$, are:

$$\tilde{I}(n\Delta f,t)\propto C(t,n\Delta\tau)e^{-i\pi(f_1\tau_1-f_2\tau_2)n^2} \quad (11)$$

If the system is adjusted such that $f_1\tau_1=f_2\tau_2$, then $$\tilde{I}(n\Delta f,t)\propto C(t,n\Delta\tau) \quad (12)$$

thereby making it possible to access the real part of the cross-correlation function at the time t.

It should be noted that this result is valid when for all values of $f_1\tau_1=f_2\tau_2$ modulo 1 (see equation 5). Modulo 1 is understood here to mean $f_1\tau_1=f_2\tau_2+k$, with $k\in\mathbb{N}$.

Otherwise, in the general case, that is to say $f_1\tau_1\neq f_2\tau_2$, modulo 1, the square moduli of the Fourier transform of I(t) at the frequencies $n\Delta f$, are:

$$|\tilde{I}(n\Delta f,t)|^2 \propto |C(t,n\Delta\tau)|^2 \quad (13)$$

thereby making it possible to access the square modulus of the cross-correlation function at the time t.

The system therefore makes it possible to compute, in the spectrum of the photodetection signal, the cross-correlation function of the input signals as a function of their time delay. This thus gives a time-frequency projection ("time to frequency mapping"). The coefficient of this projection is simply $\Delta f/\Delta\tau$.

The time step of the correlation function is $\Delta\tau$. The range of accessible delays is $N\Delta\tau$.

The invention claimed is:

1. A wideband device (D) for measuring the cross-correlation of a first signal and a second signal, comprising:
   a first source (S1) designed to generate said first signal $s_1(t)$ (Si1);
   a second source (S2) designed to generate said second signal $s_2(t)$ (Si2);
   a first frequency-shifting optical cavity (DBDF, BDF1) comprising a first frequency shifter (AOM1) designed to shift the optical frequency of the first signal by a first frequency $f_1$ per round trip in said first cavity, said first cavity having a first trip time $\tau_1$;
   a second frequency-shifting optical cavity (DBDF, BDF2) comprising a second frequency shifter (AOM1) designed to shift the optical frequency of the second signal by a second frequency $f_2$ per round trip in said second cavity, said second cavity having a second trip time $\tau 2$;
   the first and the second optical cavity being designed such that a maximum number of round trips of the first and the second signal in the first and the second cavity is equal to predetermined N
   a detector (PD) designed to coherently detect the first signal transmitted by the first cavity and the second signal transmitted by the second cavity and generate a photocurrent (Tr) proportional to a luminous intensity detected by said detector,
   a low-pass filter (LP) designed to filter frequencies of the photocurrent that are lower than $$\min\left(\frac{f_1}{2};\frac{f_2}{2}\right),$$

a processor (UT) configured to compute a Fourier transform of said photocurrent filtered by said low-pass filter, so as to generate an output signal (SS) representative, in the frequency space, of a real-time cross-correlation between the first signal and the second signal, $C(\tau)=\langle s_1(t)s_2^*(t-\tau)\rangle$, with $\tau=n(\tau_1-\tau_2)$, $n\in[1, N]$.

2. The device as claimed in claim 1, wherein the device comprises a monochromatic laser (CW), the first and the second sources respectively comprising: a first and a second RF source (AM1, AM2) designed to generate a first and a second RF signal s1(t), s2(t) and a first and a second modulator (Mod1, Mod2) designed to amplitude-modulate, using said first and said second RF signal s1(t), laser radiation generated by said continuous-wave laser, so as to form said first and said second signal.

3. The device as claimed in claim 1, wherein the first source is configured to generate a plurality of $i\in[1, p]$ first sub-signals $s_{1,i}(t)$ that are spatially and temporally superposed so as to form the first signal, each i first sub-signal having a first center frequency $f_{1,i}$ different from the others, and wherein the second source is configured to generate a plurality of $j\in[1, q]$ second sub-signals $s_{2,j}(t)$ that are spatially and temporally superposed so as to form the second signal, each j second sub-signal having a second center frequency $f_{2,i}$ different from the others,
   said output signal then being representative of a cross-correlation of each first sub-signal with each second sub-signal, $C_{i,j}(\tau)=\langle s_{1,i}(t)s_{2,j}^*(t-\tau)\rangle$, with $\tau=n(\tau_1-\tau_2)$, $n\in[1, N]$.

4. The device as claimed in claim 1, wherein the first and the second cavity are designed to verify the condition $f_1\times\tau_1=f_2\times\tau_2$ modulo 1, said output signal (SS) then corresponding to the real part of a real-time cross-correlation between the first signal and the second signal, $C(\tau)=\langle s_1(t)s_2^*(t-\tau)\rangle$, with $\tau=n(\tau_1-\tau_2)$, $n\in[1, N]$.

5. The device as claimed in claim 1, wherein the first and the second cavity are designed such that $f_1\times\tau_1\neq f_2\times\tau_2$ modulo 1, said processor furthermore being configured to compute a square modulus of a Fourier transform of said photocurrent, the output signal (SS) then corresponding to a square modulus of a real-time cross-correlation between the first signal and the second signal, $|C(\tau)|^2=|\langle s_1(t)s_2(t-\tau)\rangle|^2$, with $\tau=n(\tau_1-\tau_2)$, $n\in[1, N]$.

6. The device as claimed in claim 1, wherein the first and the second cavity respectively comprise a first and a second amplifier (EDFA, EDFA1, EDFA2) designed to compensate for the losses induced respectively by the first and the second cavity.

7. The device as claimed in claim 1, wherein the first frequency shifter is a first acousto-optic modulator excited by a first local oscillator (OL1) designed to vary said first shift frequency and wherein the second frequency shifter is a second acousto-optic modulator excited by a second local oscillator (OL2) designed to vary said second shift frequency.

8. The device as claimed in claim 7, comprising a single ring cavity (BDF), said device furthermore comprising:
   a first coupler (C1) designed to inject said first signal (V1) into said single cavity in a first direction,
   a second coupler (C2) designed to inject said second signal (V2) into said single cavity in a second direction,
   said first cavity corresponding to the single cavity into which the first signal is injected in the first injection direction,
   said second cavity corresponding to the single cavity into which the second signal is injected in the second injection direction,
   said single ring cavity comprising:
      a first circulator (CO1) designed to direct the first signal to a first controllable delay line (DL1) designed to vary the first trip time $\tau_1$ and comprising said first frequency shifter (AOM1),
      a second circulator (CO2) designed to direct the second signal to a second controllable delay line (DL2) designed to vary the second trip time $\tau_1$ and comprising said second frequency shifter (AOM2),
      a doped fiber amplifier (DFA),
      an optical bandpass filter (BP) configured to set said maximum number N of round trips.

9. The device as claimed in claim 1, wherein the first cavity comprises a first controllable delay line (DL1) designed to vary the first trip time $\tau_1$ and wherein the second cavity comprises a second controllable delay line (DL2) designed to vary the second trip time $\tau_2$.

10. The device as claimed in claim 1, wherein the first and the second cavity are fiber ring cavities (BDF1, BDF2) comprising respectively a first and a second doped fiber amplifier (DFA1, DFA2) and a first and a second optical bandpass filter (BP1, BP2) configured to set said maximum number N of round trips in the first and the second cavity.

11. The device as claimed in claim 10, comprising stabilizing means (ST) for stabilizing the first and the second cavity that are designed to maintain, over time, the coherence of said first signal transmitted by the first cavity with said second signal transmitted by the second cavity.

12. The device as claimed in claim 1, wherein the first and the second cavity are configured such that $$\frac{1}{|\tau_1 - \tau_2|} \geq 40 \text{ GHz}.$$

13. The device as claimed in claim 1, wherein the first and the second cavity are configured such that N is greater than 200.

14. A method for measuring the cross-correlation of a first and a second signal (Si1, Si2) using a first frequency-shifting optical cavity (BDF1) having a first trip time $\tau_1$ and a second frequency-shifting optical cavity (BDF2) comprising a second frequency shifter (AOM1) having a second trip time $\tau_2$, a maximum number of round trips of the first signal and of the second in the first and the second cavity being equal to predetermined N, said method comprising the following steps:

F. generating said first signal $s_1(t)$ and said second signal $s_2(t)$;

G. injecting said first signal into the first frequency-shifting optical cavity (BDF1) and shifting the optical frequency of the first signal by a first frequency $f_1$ per round trip in said first cavity, injecting said second signal into the second frequency-shifting optical cavity (BDF2) and shifting the optical frequency of the second signal by a second frequency $f_2$ per round trip in said second cavity;

H. coherently detecting the first signal transmitted by the first cavity and the second signal transmitted by the second cavity and generating the photocurrent (Tr) proportional to the detected luminous intensity, a maximum number of round trips of the first and the second signal respectively in the first and the second cavity before they are transmitted being equal to predetermined N, and I. filtering frequencies of the photocurrent that are lower than $$\min\left(\frac{f_1}{2}; \frac{f_2}{2}\right),$$

J. computing a Fourier transform of said filtered photocurrent, so as to generate an output signal (SS) that is representative of a real-time cross-correlation between the first signal and the second signal, $C(T) = \langle s_1(t) s_2^*(t-\tau) \rangle$, with $\tau = n(\tau_1 - \tau_2)$, $n \in [1, N]$.

* * * * *